(12) United States Patent
Chheda

(10) Patent No.: US 6,188,914 B1
(45) Date of Patent: *Feb. 13, 2001

(54) METHOD AND APPARATUS FOR IMPROVING LINK PERFORMANCE AND CAPACITY OF A SECTORIZED CDMA CELLULAR COMMUNICATION NETWORK

(75) Inventor: Ashvin Chheda, Dallas, TX (US)

(73) Assignee: Nortel Networks Limited, Montreal (CA)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/956,296

(22) Filed: Oct. 22, 1997

(51) Int. Cl.[7] .................................................. H04Q 7/20
(52) U.S. Cl. ............................................. 455/562; 455/561
(58) Field of Search .................................. 455/562, 522, 455/277.1, 277.2, 449, 446, 561

(56) References Cited

U.S. PATENT DOCUMENTS

| 5,276,907 | * | 1/1994  | Median .............................. 455/522 |
| 5,596,333 | * | 1/1997  | Bruckert ............................ 455/522 |
| 5,615,409 | * | 3/1997  | Forssen et al. ................... 455/562 |
| 5,684,491 | * | 11/1997 | Newman et al. ................. 455/277.1 |
| 5,742,911 | * | 4/1998  | Dumbrill et al. ................ 455/562 |
| 5,936,577 | * | 8/1999  | Shoki et al. ...................... 455/422 |
| 5,960,349 |   | 9/1999  | Chheda et al. .................... 455/446 |

* cited by examiner

*Primary Examiner*—Thanh Cong Le
*Assistant Examiner*—Myron K. Wyche
(74) *Attorney, Agent, or Firm*—Haynes and Boone, LLP

(57) ABSTRACT

A system and method for improving link performance and network capacity of a CDMA network is described. In a preferred embodiment, at each sector site, antennas having a relatively narrow horizontal beamwidth are used as transmit antennas, while antennas having a relatively wide horizontal beamwidth are used as receive antennas. Narrow beamwidth antennas are also used to implement hybrid transmit/receive antennas.

15 Claims, 1 Drawing Sheet

METHOD AND APPARATUS FOR IMPROVING LINK PERFORMANCE AND CAPACITY OF A SECTORIZED CDMA CELLULAR COMMUNICATION NETWORK

TECHNICAL FIELD

The invention relates generally to sectorized code division multiple access ("CDMA") cellular communication networks and, more particularly, to a technique for improving link performance and capacity of such a network.

BACKGROUND OF THE INVENTION

In cellular wireless communication networks, or "cellular networks," a served area is divided into cells. Each cell is further divided into sectors, except in the case of omnidirectional cells, in which the entire cell comprises a single sector. Each cell is served by at least one base station located at a cell site typically at the center of the cell. All of the base stations are connected to a message switching center ("MSC") via a base station controller ("BSC") and hardware links. A plurality of mobile units are connected to the MSC by establishing radio links with one or more nearby base stations.

In communication systems that utilize narrow-band modulations, such as analog frequency modulation ("FM"), the existence of multiple paths ("multipath") causes severe fading. However, with wideband CDMA modulation, the different paths may be independently received, thereby greatly reducing the consequences of the multipath fading. However, multipath fading cannot be completely eliminated due to the occasional occurrence of unresolved multipath, i.e., multipath that cannot be independently processed.

Diversity is the approach most commonly used to mitigate multipath fading. In a CDMA cellular network, or "CDMA network," three forms of diversity are used. These include:

time symbol interleaving, error detection, and correction coding frequency signal energy is spread over a large bandwidth space 1. multiple signal paths from simultaneous links between mobile station and different sectors (soft handoff)
2. RAKE receivers are used to combat the multipath environment by separately combining signals arriving with different (resolvable) propagation delays
3. multiple, typically two, antennas at each cell site, wherein all of the antennas at a single cell site are designed to the same specifications One of the most important effects achieved by improving a CDMA network is the increase in the network's capacity; that is, the number of calls that can be handled by the network at a given time. It should be noted that the capacity of a CDMA network is soft, i.e., the capacity of the network can be increased, but with a corresponding decrease in call quality.

CDMA network capacity takes two forms, which are forward link capacity and reverse link capacity. In practical CDMA networks, forward link capacity is the limiting form of capacity. The forward link capacity of a CDMA system is dependant on handoff and forward link transmit power requirements between sectors and mobile stations. A higher handoff and higher transmit power requirement will compromise the CDMA capacity. The following equation relates the forward link capacity to the average forward traffic channel gain and average soft handoff percentage for a CDMA network:

$$N = (1-(f_{pilot}+f_{page}+f_{synch}))/(f_{user\_avg} * hrf * v) \quad (1)$$

where:

N is the number of users an average sector can support;

$f_{pilot}$ is the fraction of total sector high power amplifier ("HPA") power allocated for the pilot channel;

$f_{page}$ is the fraction of total sector HPA power allocated for the paging channel;

$f_{synch}$ is the fraction of total sector HPA power allocated for the synch channel;

$f_{user\_avg}$ is the average fraction of total sector HPA power allocated to a user;

hrf is the handoff reduction factor, a calculated value that takes into account the required resources due to different types of handoff; and v is the average voice activity factor.

It should be noted from equation (1) that if the factors hrf and $f_{user\_avg}$ are reduced, the overall forward link capacity of the network will be increased.

The reverse link pole (i.e., maximum) capacity may be estimated using the following equation:

$$N = (W/R) * (1/(E_b/N_o)) * (1/v) * F \quad (2)$$

where:

N is the number of users per sector;

W is the spread-spectrum bandwidth;

R is the data rate;

$E_b/N_o$ is the ratio of energy per bit ($E_b$) to the noise power spectral density ($N_o$);

v is the average voice duty cycle; and

F is the frequency reuse factor.

Frequency reuse factor is the ratio of the interference from mobile units within a sector to the total interference from mobiles in all sectors. Wider antennas result in marginally lower frequency reuse factors.

The capacity of a network is typically increased via sectorization. This is accomplished by the use of directional antennas. A directional antenna reduces the interference seen at a base station because it only receives in the direction of the antenna. In fact, if the antenna had no side-lobes or back-lobes, which reduce the frequency reuse factor (F), the out-of-interference would be further reduced, increasing F.

Depending on the purpose of the particular CDMA network considered, cell site separation may be designed based on "link budget" calculations. The link budget enables the network planners to separate the cell sites as far as possible, while maintaining adequate coverage or coverage to a given grade of service. In such cases, the reverse link budget is used to determine cell site separation.

In other cases, in particular, when there is a surplus link budget, the cell sites are positioned in closer proximity to one another. In cases where the network is designed for capacity, there is a surplus link budget. In these cases, higher capacity means a greater number of users in a given area.

In FIG. 1, a typical CDMA network is designated generally by a reference numeral 10. In a preferred embodiment, the system 10 is comprised of a plurality of cells, represented in FIG. 1 by cells C1 and C2. Each of the cells C1, C2, is divided into a plurality of sectors S1, S2, S3 and S4, S5, S6, respectively, through use of a plurality of directional antennas (FIG. 2) located at or near a respective base station BS1, BS2. Although the cells C1, C2, are shown as being divided into three sectors, it will be recognized by those skilled in the art that cells may be subdivided into one or more sectors depending on the configuration of the system 10. As previously noted, each cell C1, C2, comprises a base station B1, B2, respectively, the primary function of which is to provide over-the-air radio frequency ("RF") communication with mobile units, such as a mobile unit 12.

Each base station B1, B2, is further connected via a link to a base station controller ("BSC") 18, which is connected to a mobile switching center ("MSC") 22. As the elements comprising the system 10, as well as the configuration thereof, are well known in the art, the details thereof will not be further described, except as necessary to impart a complete understanding of the present invention.

As illustrated in FIG. 2, for each sector, there are typically two antennas 200, 202, located at a "sector site" 204 thereof. In some cases, as shown in FIG. 2, one of the antennas 200 functions as a hybrid transmit/receive antenna, while the other antenna 202 functions as a receive only antenna. The antennas 200, 202, are usually are separated far enough apart to ensure that the individual energy that each antenna captures has faded independently. Generally, both antennas have been of the same specifications, including antenna beamwidth, material, size, gain, and others.

Clearly, increasing the capacity and reliability of a CDMA network is a constant focus of network planners. Therefore, what is needed is a technique for improving both link performance (i.e., coverage) and capacity of a sectorized CDMA network.

SUMMARY OF THE INVENTION

The present invention, accordingly, provides a system and method for improving both link performance and network capacity of a CDMA network. In a preferred embodiment, at each sector site, antennas having a relatively narrow horizontal beamwidth are used as transmit antennas, while antennas having a relatively wide horizontal beamwidth are used as receive antennas. Narrow beamwidth antennas are also used to implement hybrid transmit/receive antennas.

A technical advantage achieved with the invention is that using narrow beamwidth antennas as transmit antennas results in increased forward link capacity, which is the limiting form of capacity A technical advantage achieved with the invention is that using wide beamwidth antennas as receive antennas results in increased reverse link coverage. In other words, using a narrow antenna to transmit and to receive would increase capacity but limit coverage, while using a wide antenna to transmit and receive would reduce capacity but increase coverage. Using a narrow antenna to transmit and a wide antenna to receive would increase both capacity and coverage.

Yet another technical advantage achieved with the invention is that, by increasing coverage, cell sites can be spaced apart a greater distance, which results in a decrease in the number of cell sites needed to cover a given area, assuming that the system is designed for maximum coverage. The added capacity for the greater coverage is a bonus.

DESCRIPTION OF THE PREFERRED EMBODIMENT

Figure 1:
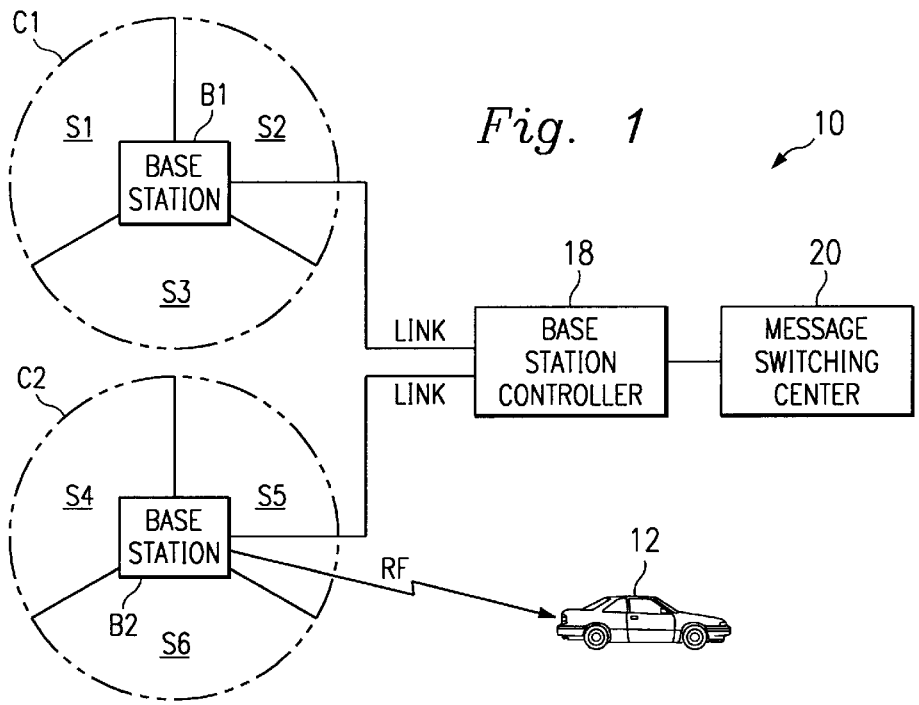
FIG. 1 is a system block diagram of a CDMA network embodying features of the present invention.
Figure 2:
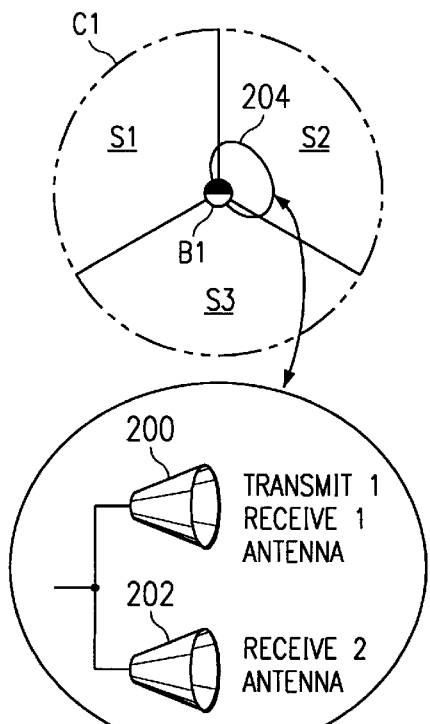
FIG. 2 illustrates a typical arrangement of antennas at a sector site of the CDMA network of FIG. 1.

As described in detail above, FIG. 1 illustrates a CDMA network and FIG. 2 illustrates an arrangement of antennas at a cell site of the CDMA network of FIG. 1.

Simulations have demonstrated that the hrf and the average forward link transmit power are reduced as the antenna beam width narrows, resulting in increased forward link capacity. The reason for the increased forward link capacity is that the side-lobe interference from adjacent sectors is less and because there is significantly less softer handoff, which consumes capacity. This increase has been demonstrated to be on the order of 10–15%. The increase in forward link capacity is shared by an increase in reverse link capacity, since the frequency reuse factor for the narrower antenna is higher. Table I below presents the frequency reuse factor for different antenna beamwidths of a tri-cellular embedded network of CDMA cells:

TABLE I

| Horizontal Antenna Beamwidth (°) | Frequency Reuse Factor |
|---|---|
| 60 | 0.604 |
| 70 | 0.591 |
| 80 | 0.573 |
| 90 | 0.566 |
| 100 | 0.536 |

Reverse link coverage as a function of cell site location becomes an issue as the antenna beamwidth is narrowed; that is, there is a higher probability that the reverse link coverage will result in holes, causing dropped calls and adversely affecting reverse link quality, unless the cell sites are brought in closer together. In other words, a narrower antenna system would be fine so long as the cell sites are sufficiently close together; however, if for example, an existing network of 90° beamwidth antennas was converted to 60° beamwidth antennas without costly but necessary cell site relocation, the aforementioned problems would surface Again, simulations have shown that the difference between a 90° antenna and a 60° antenna in a tri-cellular CDMA network environment results in a mobile average transmit power that is 50–60% lower for the wider antenna. This is important, because there is a reduction in transmitter power requirement to overcome noise and interference, resulting in a lower reverse link dropped call probability, longer battery life, and an overall increase in reliability. In other words, there is a smaller likelihood that the upper limit on the mobile power requirements will be reached. This reduction also means that the mobile station has lower incidental costs and allows the lower power units to operate at larger ranges.

In summary, it can be demonstrated that a narrow beamwidth antenna has positive effects on forward link capacity, while a wide beamwidth antenna has positive effects on reverse link coverage.

Figure 3:
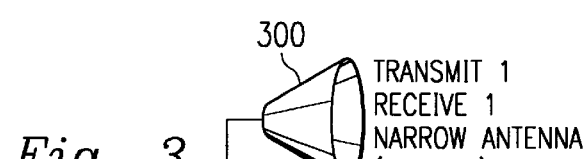
FIG. 3 illustrates one arrangement of antennas at a sector site in accordance with features of the present invention.

FIG. 3 illustrates an arrangement of antennas embodying features of the present invention. In particular, as shown in FIG. 3, by using a narrow beamwidth (e.g., 60°) antenna as a combined transmit/receive antenna 300 and a wide beamwidth (e.g., 90°) antenna a second receive antenna 302, both forward link capacity and reverse link coverage are improved.

Figure 4:
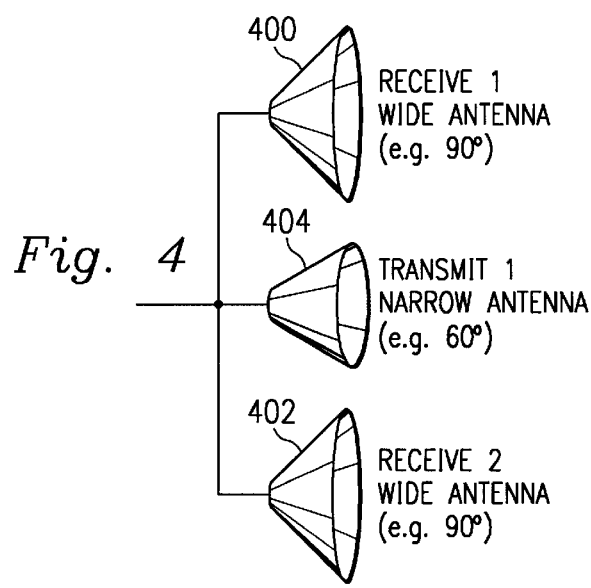
FIG. 4 illustrates an alternative arrangement of antennas at a sector site in accordance with features of the present invention.

In an alternative arrangement, illustrated in FIG. 4, two separate receive antennas 400, 402, are implemented using wide beamwidth (e.g., 90°) antennas, while a separate transmit antenna is implemented using a narrow beamwidth (e.g. 60°) antenna 404. The embodiment shown in FIG. 4 is more costly to implement, but has the advantages, including that the antennas 400, 402, are the of the same type, performance, troubleshooting, and link budget analysis are easier to perform because the antenna arrangement is symmetrical.

The difference between the wide and narrow antenna beamwidths, in the cases illustrated in FIGS. 3 and 4, 30°, is impacted by link balancing issues. In other words, the CDMA network improvement is also dependent on the forward and reverse links being balanced. For example, referring again to FIG. 1, if the mobile unit 12 is located somewhere between two sectors, e.g., sector S5 and sector S6, but the forward link to sector S5 is superior to the forward link to sector S6, the mobile unit 12 would be handled by sector S5, unless it is in soft handoff with both sector S5 and sector S6. If, however, the reverse link to sector S6 is better than the reverse link to sector S5, and the mobile unit 12 is not in handoff with sector S6, the reverse link capacity is compromised. This is because the mobile unit 12 is not reverse link power-controlled by sector S6, which in this case it should be. The frequency reuse factor will reflect this. Again, the impact on the reverse link capacity is acceptable as long as it is above the CDMA network 10 forward link limited capacity.

Simulations have demonstrated that the frequency reuse factor for the embodiment shown in FIG. 3 is approximately 0.549. This is due to locations in which the mobile unit is not in handoff (controlled by the forward link antenna) with a sector that has a superior reverse link.

It is also recognized that next-generation networks may use an array of antennas at each sector. Applying the teachings of the present invention to such arrays, it is apparent that narrow beamwidth antennas could be used for the transmit (forward link) antennas, while wider beamwidth antennas could be used for the receive (reverse link) antennas.

For networks that are to be with two different antennas, the choice of wide versus narrow antennas is limited by several factors. First, expected reduction in the reverse link frequency reuse factor determines the difference between the wide and narrow antenna, as well as the upper limit on the wide antenna. Second, the excessive softer handoff impact on the forward link capacity contributes to the upper limit on the narrow antenna. Third, the path loss or link budget constrains the lower limit in narrowing the antennas. In particular, antennas that are too narrow will undoubtedly cause reverse link holes to open, unless cell sites are placed closer together. In addition, if the narrow antenna is too narrow, there will be regions in the sector where the narrow antenna is rendered effectively useless; therefore, only the wide antenna is of use. The loss of one antenna increases the reverse link Eb/No requirements, due to loss of special diversity, which ultimately increase the transmit power requirements of the mobile unit and may reduce reverse link capacity to the extent that it is the limiting form of capacity. Finally, a very narrow antenna, though reducing interference along the side of the sector, may require the sector to increase its transmit power to users along its sides, as a thermal noise floor exists that does not depend on multiple access interference.

Narrow antennas can also be utilized at slightly higher gains, while wide antennas would have slightly lower gains. This would help the reverse link performance in terms of reverse link coverage holes, while not unduly hindering the forward link performance for link balancing issues. It should also be noted that the gains should not be significantly different. Another point to note is that higher gain antennas are larger in size, which is a limitation that needs to be addressed and may cost more money. in addition, the increase in gain is typically incremental, on the order of 2–4 dB.

The concept of antenna behavior can be further refined if similar antennas are used, but the receive antenna has a slower roll-off past the 3 dB point. In other words, the transmit antenna would have the same horizontal beamwidth as the transmit antenna, but a significantly slower roll-off.

Consequently, if the CDMA network is designed to meet a link budget, the link budget should be ideally designed with the narrow antenna in mind.

It should be noted that the teachings of the present invention are applicable to any level of sectorization with a corresponding adjustment in the antenna beamwidth. For example, as previously described, 90°/60° are the reasonable beamwidth choices for a sectorization of three (i.e., three sectors per cell), while 60°/40° and 45°/30° are the reasonable beamwidth choices for sectorizations of four (i.e., four sectors per cell) and six (i.e., six sectors per cell), respectively.

The above-described techniques could also be used for cells that are not equally sectorized. In other words, referring again to FIG. 1, if sector S1 is dealing with a wider perspective than sectors S2 or S3, sector S1 may have a 80°/100° combination of antennas at its sector site, while sectors S2 and S3 each have a 60°/90° combination of antennas.

Although an illustrative embodiment of the invention has been shown and described, other modifications, changes, and substitutions are intended in the foregoing disclosure. Accordingly, it is appropriate that the appended claims be construed broadly and in a manner consistent with the scope of the invention.

What is claimed is:

1. A method of improving link capacity of a sectorized code division multiple access ("CDMA") network, the method comprising steps of:
   (a) installing at at least one sector site of said CDMA network a first antenna having a first beamwidth; and
   (b) installing at said at least one sector site of said CDMA network a second antenna having a second beamwidth;
      wherein said first beamwidth is greater than said second beamwidth; and
      wherein said first antenna is a receive-only antenna and said second antenna is a transmit-only antenna.

2. The method of claim 1 further comprising:
   (c) installing at said at least one sector site of said CDMA network a third antenna having beamwidth equal to said first beamwidth, wherein said third antenna is a receive-only antenna.

3. The method of claim 1 wherein a sectorization of said CDMA network is three and wherein said first and second beamwidths are approximately 90° and 60°, respectively.

4. The method of claim 1 wherein a sectorization of said CDMA network is four and wherein said first and second beamwidths are approximately 60° and 40°, respectively.

5. The method of claim 1 wherein a sectorization of said CDMA network is six and wherein said first and second beamwidths are approximately 45° and 30°, respectively.

6. The method of claim 1 wherein said step (a) further comprises installing at each sector site of said CDMA network a first antenna having a beamwidth equal to said first beamwidth.

7. The method of claim 1 wherein said step (b) further comprises installing at each sector site of said CDMA network a second antenna having a beamwidth equal to said second beamwidth.

8. The method of claim 2 wherein said step (c) further comprises installing at each sector site of said CDMA network a third antenna having a beamwidth equal to said first beamwidth.

9. A code division multiple access ("CDMA") network having improved link capacity and performance, the CDMA network comprising:

a plurality of cells each comprising a plurality of sectors, wherein each of said sectors includes a sector site;

a first antenna installed at each of said sector sites; and a second antenna installed at each of said sector sites;

wherein at each sector site, a beamwidth of said first antenna of said sector site is greater than a beamwidth of said second antenna of said sector site; and wherein said first antenna is a receive-only antenna and said second antenna is a transmit-only antenna.

10. The CDMA network of claim 9 further comprising:

a third antenna installed at each of said sector sites;

wherein a beamwidth of each of said third antennas is equal to that of each of said first antennas and wherein the third antenna is a receive-only antenna.

11. The CDMA network of claim 9 wherein a sectorization of said CDMA network is three and wherein said beamwidths of each said first and second antennas are approximately 90° and 60°, respectively.

12. The CDMA network of claim 9 wherein a sectorization of said CDMA network is four and wherein said beamwidths of each said first and second antennas are approximately 60° and 40°, respectively.

13. The CDMA network of claim 9 wherein a sectorization of said CDMA network is six and wherein said beamwidths of each first and second antennas are approximately 45° and 30°, respectively.

14. A method of improving link capacity of a sectorized code division multiple access ("CDMA") network, the method comprising steps of:

(a) installing at at least one sector site of said CDMA network a first antenna having a first beamwidth; and (b) installing at said at least one sector site of said CDMA network a second antenna having a second beamwidth equal to two-thirds of said first beamwidth; and wherein said first antenna is a receive-only antenna and said second antenna is a transmit-only antenna.

15. A code division multiple access ("CDMA") network having improved link capacity and performance, the CDMA network comprising:

a plurality of cells each comprising a plurality of sectors, wherein each of said sectors includes a sector site;

a first antenna installed at each of said sector sites; and a second antenna installed at each of said sector sites;

wherein at each sector site, a beamwidth of said second antenna of said sector site is equal to two thirds the beamwidth of first second antenna of said sector site; and wherein said first antenna is a receive-only antenna and said second antenna is a transmit-only antenna.

* * * * *

UNITED STATES PATENT AND TRADEMARK OFFICE
CERTIFICATE OF CORRECTION

PATENT NO. : 6,188,914 B1  
DATED : February 13, 2001  
INVENTOR(S) : Ashvin Chheda Page 1 of 1

It is certified that error appears in the above-identified patent and that said Letters Patent is hereby corrected as shown below:

<u>Column 2,</u>
Line 49, replace "out-of-interference" with -- out-of-sector interference --

Signed and Sealed this

Second Day of April, 2002

Attest:

JAMES E. ROGAN
*Attesting Officer*     *Director of the United States Patent and Trademark Office*